United States Patent Office 3,388,123
Patented June 11, 1968

3,388,123
(OPTIONALLY 17-ALKYLATED) 2,3-IMINO-5α-ANDROSTAN 17β - OLS AND INTERMEDIATES THERETO
Paul D. Klimstra, Northbrook, Ill., assignor to G. D. Searle & Co., Chicago, Ill., a corporation of Delaware
No Drawing. Filed Sept. 21, 1966, Ser. No. 580,888
10 Claims. (Cl. 260—239.5)

ABSTRACT OF THE DISCLOSURE (Optionally 17-alkylated) 2,3-imino-5α-androstan-17β-ols useful as pharmacological agents, in particular as androgenic and estrogeni inhibitory compounds.

The present invention is concerned with novel steroidal derivatives characterized by a 2,3-imino moiety and especially with (optionally 17-alkylated) 2,3-imino-5α-androstan-17β-ols which are represented by the following structural formula

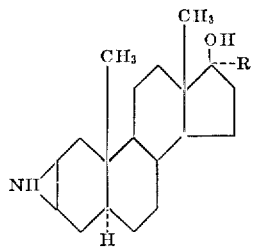

wherein R is symbolic of hydrogen or a lower alkyl radical and wavy lines indicate that the stereochemical configuration of the imino group can be either 2α,3α or 2β,3β.

In the foregoing structural representation the lower alkyl radicals symbolized by the R term are typified by methyl, ethyl, propyl, butyl, pentyl, hexyl, heptyl and the branched-chain groups isomeric therewith.

The 2,3-imino compounds of this invention display valuable pharmacological properties. They are, for example, hormonal and anti-hormonal agents as is demonstrated by their androgenic and anti-estrogenic activity.

A method suitable for the manufacture of the novel compounds of this invention involves the use as starting materials of substances characterized by the following structural formula

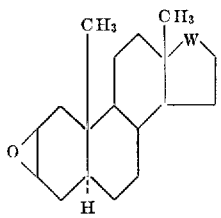

wherein W represents either a carbonyl or α-(lower alkyl)-β-hydroxymethylene group and the wavy lines, as hereinbefore, indicate the alternative 2α,3α or 2β,3β stereochemical configuration. When the latter substances are contacted with a metallic azide in an aqueous medium containing a suitable inert water-miscible organic solvent, cleavage of the epoxide ring occurs, thus resulting in the corresponding 2,3-azido/hydroxy intermediates. That process is exemplified by the reaction of 2α,3α-epoxy-5α-androstan-17-one or 2β,3β-epoxy-17α-methyl-5α-androstan -17β-ol with sodium azide in aqueous dioxane to yield 2β-azido-3α-hydroxy-5α-androstan-17-one and 3α-azido-17α-methyl-5α-androstane-2β,17β-diol, respectively.

The later 2,3-azido/hydroxy intermediates are then acylated to form an ester whose oxygenated function is readily removed. Sulfonyloxy and alkanoyloxy groups are especially preferred. Those "leaving" groups are exemplified by methanesulfonyloxy, benzenesulfonyloxy, p-toluenesulfonyloxy and acetoxy. A specific example is the reaction of 2β-azido-3α-hydroxy-5α-androstan-17-one with methanesulfonyl chloride in pyridine, thus affording the corresponding 3-methanesulfonate.

The foregoing 2,3-azido/acyloxy intermediates are converted to the instant 2,3-imino compounds by reaction in a suitable reducing medium. Metallic hydride reducing agents such as lithium aluminum hydride, sodium borohydride and diisobutyl aluminum hydride are particularly convenient. 3α - azido-17α-methyl-5α-androstane-2β,17β-diol 2-methanesulfonate is thus converted to 2α,3α-imino-17α-methyl-5α-androstan-17β-ol by reaction with lithium aluminum hydride in ether. That reduction can be accomplished also by use of hydrazine in the presence of Raney nickel catalyst. 2β-azido-5α-androstane-3α,17β-diol 3-methanesulfonate, for example, is heated with hydrazine hydrate in ethanol in the presence of Raney nickel catalyst to afford 2β,3β-imino-5α-androstan-17β-ol.

As indicated hereinbefore, the present invention encompasses also novel intermediates useful in the manufacture of the instant 2,3-imino compounds. Those novel intermediates are represented by the following structural formula

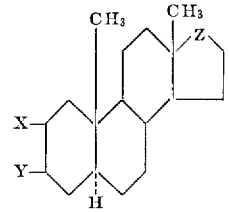

wherein X is an azido, hydroxy or methanesulfonyloxy radical, Y is an azido or methanesulfonyloxy radical and Z is a carbonyl, β-hydroxymethylene or α-(lower alkyl)-β-hydroxymethylene group. The lower alkyl radicals encompassed by the Z term are as hereinbefore exemplified. These novel intermediates are useful furthermore in view of their valuable pharmacological properties. They are, for example, androgenic, estrogenic, hypocholesterolemic, anti-estrogenic and dicotyledenous seed germination inhibitory agents.

An alternate method for manufacture of the instant 2β,3β-imino compounds utilizes as starting materials androst-2-en-17β-ols of the following structural formula

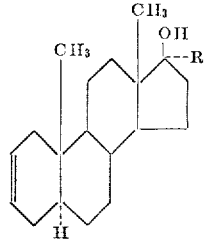

wherein R is as hereinbefore defined. When those materials are allowed to react with silver cyanate and iodine, and the intermediate 2β-isocyanato-3α-iodo compounds are heated with a lower alkanol, the corresponding 2β-alkoxy-carbonylamino-3α-iodo substances are produced. The latter substances are conveniently cyclized by heating with an alkaline reagent to produce the corresponding 2β,3β-imino compound. Those processes are specifically illustrated by the reaction of 17α-methyl-5α-androst-2-en-17β-ol with silver cyanate and iodine, then with methanol to afford 3α-iodo-2β-methoxycarbonylamino-17α-methyl-5α- androstan-17β-ol and heating of the latter intermediate with potassium hydroxide in aqueous ethanol, thus producing 2β,3β-imino-17α-methyl-5α-androstan-17β-ol.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples, temperatures are given in degrees centigrade (° C.). Quantities of materials are expressed in parts by weight unless otherwise noted.

EXAMPLE 1

To a solution of 2 parts of 2α,3α-epoxy-5α-androstan-17-one in 20 parts of dioxane is added a solution of 0.7 part of sodium azide in 3 parts of water, and the resulting reaction mixture is heated at the reflux temperature for about 24 hours, then is poured into a mixture of ice and water. After stirring for about 30 minutes, the precipitated solid is collected by filtration, washed on the filter with water and dried. Recrystallization from a mixture of hexane and acetone results in pure 2β-azido-3α-hydroxy-5α-androstan-17-one, melting at about 164–165.5°. It is further characterized by an optical rotation of +103° in chloroform.

To a solution of 5 parts of 2β-azido-3α-hydroxy-5α-androstan-17-one in 25 parts of pyridine, in a nitrogen atmosphere, is added, with cooling and stirring, 7.4 parts of methanesulfonyl chloride. The reaction mixture is stored at room temperature for about 16 hours, then is carefully poured into water. The precipitate which forms is collected by filtration and extracted into ether. The organic solution thus obtained is washed successively with water, saturated aqueous ammonium chloride and water, then dried over anhydrous sodium sulfate containing decolorizing carbon and stripped of solvent under reduced pressure. The resulting solid residue is recrystallized from acetone-hexane to yield 2β-azido-3α-hydroxy-5α-androstan-17-one 3-methanesulfonate, melting at about 151–153°. This compound exhibits an optical rotation of +92.5° in chloroform and is further characterized by the following structural formula

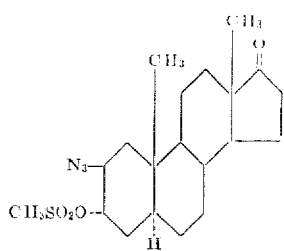

EXAMPLE 2

A solution of 1.5 parts of 2β-azido-3α-hydroxy-5α-androstan-17-one 3-methanesulfonate in 40.5 parts of tetrahydrofuran is stirred and cooled at 0–5°, and 3.5 parts of lithium tri-(tertiary-butoxy) aluminum hydride is added all at once. The resulting reaction mixture is stirred for about 40 minutes, then is poured into excess aqueous acetic acid. The resulting precipitated crude product is collected on a filter, then is washed with water and dried in air. Purification by recrystallization from aqueous acetone yields pure 2β-azido-5α-androstane-3α,17β-diol 3-methanesulfonate, melting at about 104°. This compound is further characterized by an optical rotation, in chloroform, of +45.5°. It is represented by the following structural formula

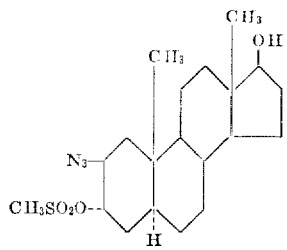

EXAMPLE 3

When an equivalent quantity of 2β,3β-epoxy-17α-methyl-5α-androstan-17β-ol is substituted in the procedure of Example 1, there is produced 3α-azido-17α-methyl-5α-androstane-2β,17β-diol, melting at about 157–158°. This compound is represented by the following structural formula

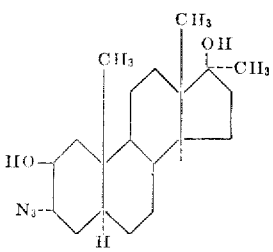

EXAMPLE 4

To a solution of 8 parts of 3α-azido-17α-methyl-5α-androstane-2β,17β-diol in 40 parts of pyridine, in a nitrogen atmosphere, is added dropwise over a period of about 30 minutes, with stirring and cooling, 3.55 parts of methanesulfonyl chloride. Stirring is continued for about one hour longer, after which time the mixture is allowed to stand at room temperature for about 16 hours. It is then carefully poured into a mixture of ice and water, and the resulting aqueous mixture is extracted with ethyl acetate. The organic layer is separated, washed successively with water, dilute hydrochloric acid and dilute aqueous sodium bicarbonate, then dried over anhydrous sodium sulfate containing decolorizing carbon. The crude product is obtained by distillation of the solvent under reduced pressure. The resulting solid residue is purified by recrystallization from methanol to afford 3α-azido-17α - methyl - 5α - androstane - 2β,17β - diol 2-methanesulfonate, melting at about 194–196°. This compound is represented by the following structural formula

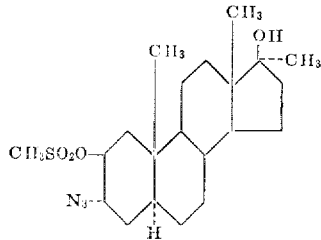

EXAMPLE 5

A solution of 3 parts of 2β-azido-17α-methyl-5α-androstane-3α,17β-diol in 15 parts of pyridine is stirred and cooled while 1.3 parts of methanesulfonyl chloride is added. The reaction mixture is then stored at 0–5° for about 16 hours, after which time it is poured into a mixture of ice and water, then made acidic by the addition of dilute hydrochloric acid. The gummy material which forms is extracted into ether, and the ether solution is separated, then washed successively with dilute hydrochloric acid and dilute sodium bicarbonate. Drying over anhydrous sodium sulfate followed by distillation of the solvent under reduced pressure affords a glass-like residue, which is purified by recrystallization from aqueous methanol to yield pure 2β-azido-17α-methyl-5α-androstane-3α,17β-diol 3-methanesulfonate, melting at about 159–161°. This compound exhibits an optical rotation of +29° in chloroform and is further characterized by the following structural formula

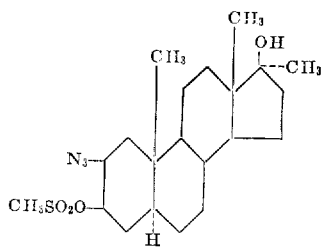

EXAMPLE 6

When an equivalent quantity of 2α,3α-epoxy-17α-ethyl-5α-androstan-17β-ol is subjected to the successive processes of Example 1, there are produced 2β-azido-17α-ethyl-5α-androstane-3α,17β-diol and 2β-azido-17α-ethyl-5α-androstane-3α,17β-diol 3-methanesulfonate.

EXAMPLE 7

By substituting an equivalent quantity of 2β,3β-epoxy-17α-ethyl-5α-androstan-17β-ol and otherwise preceeding according to the process described in Example 1, there is produced 3α-azido-17α-ethyl-5α-androstane-2β,17β-diol.

EXAMPLE 8

The substitution of an equivalent quantity of 3α-azido-17α-ethyl-5α-androstane-2β,17β-diol in the procedure described in Example 4 results in 3α-azido-17α-ethyl-5α-androstane-2β,17β-diol 2-methanesulfonate.

EXAMPLE 9

Method A

To a refluxing solution of 8 parts of 2β-azido-5α-androstane-3α,17β-diol 3-methanesulfonate in 240 parts of ethanol is added successively 41.2 parts of 100% hydrazine hydrate and 0.5 part of Raney nickel. Refluxing of the resulting solution is continued for about 2 hours, after which time it is diluted with water and cooled. Sodium chloride is added, and the aqueous mixture is extracted with ethyl acetate. The organic layer is separated, washed with water, dried over anhydrous sodium sulfate and stripped of solvent under reduced pressure to afford an oil which solidifies upon standing. That crude material is dissolved in approximately 40 parts of isopropyl alcohol, and the resulting solution is added to 24 parts of an isopropyl alcohol solution containing 2 parts of maleic acid. Crystallization of the maleate salt is induced by cooling at 0–5° and dilution with ether. The crystals are collected by filtration, then dissolved in methanol, and a solution of 2 parts of potassium carbonate in 20 parts of water is added. Dilution with water followed by cooling results in precipitation of the desired product, which is separated by filtration to afford 2β,3β-imino-5α-androstan-17β-ol, melting at about 98–102°. This compound is represented by the following structural formula

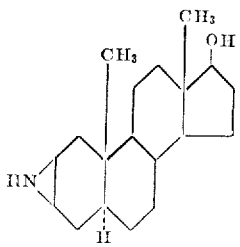

Method B

A solution of 3 parts of 2β-azido-3α-hydroxy-5α-androstan-17-one 3-methanesulfonate in 10 parts of dioxane, under nitrogen, is diluted with approximately 105 parts of ether, and 4 parts of powdered lithium aluminum hydride is added with stirring over a period of about 30 minutes. The resulting reaction mixture is stirred at room temperature for about 5 hours, after which time wet ether and excess 30% aqueous sodium potassium tartrate are successively added. The ether layer is separated by decantation, then is washed with water and dried over anhydrous sodium sulfate. Removal of the solvent by distillation under reduced pressure affords an oily residue which solidifies upon standing. Recrystallization of that crude solid from either ethyl acetate or aqueous methanol affords 2β,3β-imino-5α-androstan-17β-ol, identical with the product of Method A.

EXAMPLE 10

To a solution of 3 parts of 17α-methyl-5α-androst-2-en-17β-ol in 31.5 parts of tetrahydrofuran, under nitrogen, is added 4.4 parts of silver cyanate (freshly prepared by the reaction of 25 parts of silver nitrate with 12.35 parts of potassium cyanate in 925 parts of water). The resulting slurry is cooled to approximately −15°, then is stirred rapidly while 2.5 parts of iodine is added all at once. That reaction mixture is stirred for about 90 minutes at a temperature of −15 to 10°, then is stirred for about 16 hours at room temperature. The precipitated salts are removed by filtration through diatomaceous earth and are washed with 16 parts of methanol. The resulting filtrate is heated gently at the reflux temperature for about 4 hours, then is concentrated to approximately one-fourth volume by distillation under reduced pressure. Dilution with cold water results in precipitation of the product, which is collected by filtration, washed with water, then recrystallized from methanol to afford 3α-iodo-17α-methyl-2β-methoxycarbonylamino-5α-androstan-17β-ol, melting at about 168–175° with decomposition.

A solution containing 4 parts of 3α-iodo-17α-methyl-2β-methoxycarbonylamino-5α-androstan-17β-ol, 160 parts of ethanol, 20 parts of water and 20 parts of potassium hydroxide is heated at the reflux temperature for about 2 hours, then is diluted with approximately 650 parts of cold water. The precipitate which forms is collected by filtration and extracted with a 1:1 mixture of isopropyl alcohol and ether. To that ether solution is added 28 parts of an ethereal solution containing one part of maleic acid. The precipitate which forms is collected by filtration and dissolved in approximately 60 parts of methanol. To that organic solution is added a solution of 2 parts of potassium carbonate in 50 parts of water. Additional water is added in order to precipitate the product, which is collected by filtration, washed on the filter with water and dried in air to yield 2β,3β-imino-17α-methyl-5α-androstan-17β-ol methanolate. This compound is represented by the following structural formula

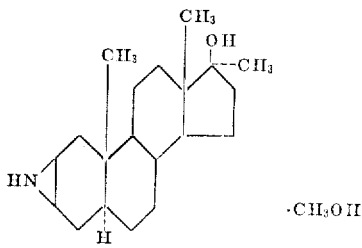

EXAMPLE 11

To a solution of 2 parts of 3α-azido-17α-methyl-5α-androstane-2β,17β-diol 2-methanesulfonate in 140 parts of ether, under nitrogen, is added carefully 2 parts of lithium aluminum hydride. The resulting reaction mixture is stirred at room temperature for about 5 hours, after which time wet ether and excess 30% aqueous sodium potassium tartrate are successively added. After stirring for a short time, the ether layer is separated by decantation, then is washed several times with water and dried over anhydrous sodium sulfate. Removal of the solvent by distillation under reduced pressure affords the crude product as a granular solid. Purification by recrystallization from methanol yields pure 2α,3α-imino-17α-methyl-5α-androstan-17β-ol, melting at about 178–180°. It is represented by the following structural formula

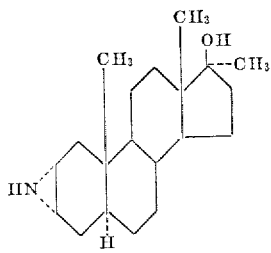

EXAMPLE 12

When an equivalent quantity of 2β,3β-epoxy-5α-androstan-17-one is substituted in the procedures of Example 1, there are produced 3α-azido-2β-hydroxy-5α-androstan-17-one and 3α-azido-2β-hydroxy-5α-androstan-17-one 2-methanesulfonate.

The substitution of an equivalent quantity of 3α-azido-2β-hydroxy-5α-androstan-17-one 2-methanesulfonate in either of the procedures of Example 9 results in 2α,3α-imino-5α-androstan-17β-ol.

EXAMPLE 13

When an equivalent quantity of 17α-ethyl-5α-androst-2-en-17β-ol is substituted in the procedures of Example 10, there is produced 17α-ethyl-2β,3β-imino-5α-androstan-17β-ol.

EXAMPLE 14

The substitution of an equivalent quantity of 3α-azido-17α-ethyl-5α-androstane-2β,17β-diol 2-methane-sulfonate in the procedure of Example 11 results in 17α-ethyl-2α,3α-imino-5α-androstan-17β-ol.

What is claimed is:
1. A compound of the formula

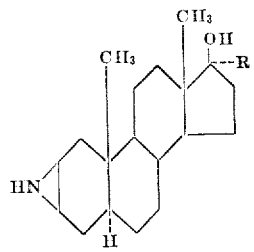

wherein R is selected from the group consisting of hydrogen and a lower alkyl radical.

2. As in claim 1, a compound of the formula

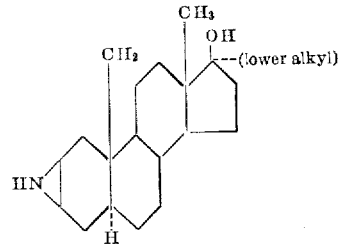

3. As in claim 1, the compound which is 2β,3β-imino-17α-methyl-5α-androstan-17β-ol.

4. As in claim 1, the compound which is 2α,3α-imino-17α-methyl-5α-androstan-17β-ol.

5. A compound of the formula

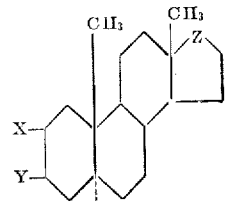

where X is selected from the group of radicals consisting of azido, hydroxy and methanesulfonyloxy, Y is selected from the group of radicals consisting of azido and methanesulfonyloxy with the provision that at least one but not both of the radicals represented by X and Y is, at the same time, azido and Z is selected from the group of radicals consisting of carbonyl, β-hydroxymethylene and α-(lower alkyl)-β-hydroxymethylene.

6. As in claim 5, a compound of the formula

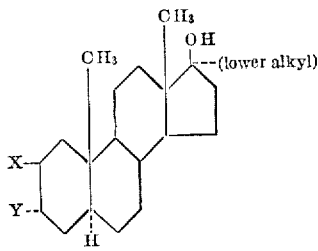

wherein X is selected from the group of radicals consisting of azido, hydroxy and methanesulfonyloxy and Y is selected from the group of radicals consisting of azido and methanesulfonyloxy with the provision that at least one but not both of the radicals represented by X and Y is, at the same time azido.

7. As in claim 5, the compound which is 2β-azido-5α-androstane-3α,17β-diol 3-methanesulfonate.

8. As in claim 5, the compound which is 3α-azido-17α-methyl-5α-androstane-2β,17β-diol.

9. As in claim 5, the compound which is 3α-azido-17α-methyl-5α-androstane-2β,17β-diol 2-methanesulfonate.

10. As in claim 5, the compound which is 2β-azido-17α-methyl-5α-androstane-3α,17β-diol 3-methanesulfonate.

References Cited
UNITED STATES PATENTS
3,238,194  3/1966  Klimstra et al. _____ 260—239.5

ELBERT L. ROBERTS, *Primary Examiner.*

UNITED STATES PATENT OFFICE
CERTIFICATE OF CORRECTION

Patent No. 3,388,123            June 11, 1968

Paul D. Klimstra

It is certified that error appears in the above identified patent and that said Letters Patent are hereby corrected as shown below:

Column 1, line 14, "estrogeni inhibitory" should read -- estr inhibitory --; lines 22 to 33, and column 7, lines 51 to 64, the formulas, each occurrence, should appear as shown below:

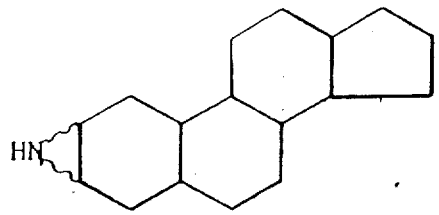

Column 1, lines 49 to 58, the formula should appear as shown below:

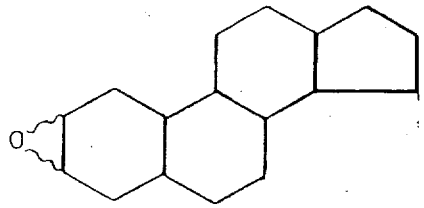

Column 2, lines 28 to 37, the formula should appear as shown below:

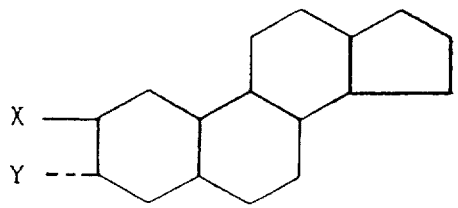

Column 4, lines 21 to 32, the formula should appear as shown below:

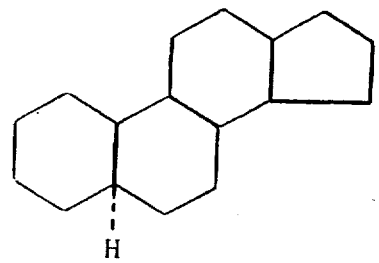

Column 8, lines 2 to 12, the formula should appear as shown below:

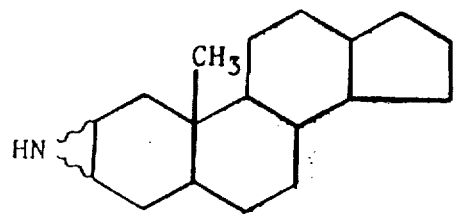

Same column 8, lines 17 to 26, the formula should appear as shown below:

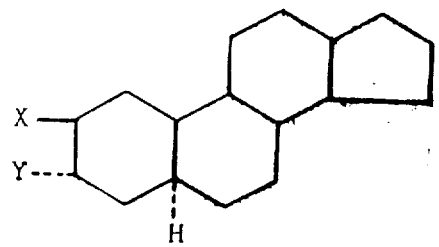

Signed and sealed this 3rd day of March 1970.

(SEAL)
Attest:

EDWARD M. FLETCHER, JR.
Attesting Officer

WILLIAM E. SCHUYLER, JR
Commissioner of Patents